United States Patent [19]
Silva

[11] Patent Number: 4,787,733
[45] Date of Patent: Nov. 29, 1988

[54] METHOD FOR DESIGNING PROGRESSIVE ADDITION LENSES

[75] Inventor: Donald E. Silva, Cardiff, Calif.

[73] Assignee: Polycore Optical Pte Ltd, Singapore

[21] Appl. No.: 934,203

[22] Filed: Nov. 24, 1986

[51] Int. Cl.$^4$ ............................................... G02C 7/06
[52] U.S. Cl. ...................................... 351/177; 351/169
[58] Field of Search .................... 351/159, 168–172, 351/177

[56] References Cited

U.S. PATENT DOCUMENTS

| | | | |
|---|---|---|---|
| 4,606,622 | 8/1986 | Fueter et al. | 351/169 |
| 4,613,217 | 9/1986 | Fueter et al. | 351/177 X |

Primary Examiner—John K. Corbin
Assistant Examiner—Scott J. Sugarman

[57] ABSTRACT

A method of designing progressive addition lenses is provided in which the surface of the lens is in effect synthesized directly from its specification. A desired pattern of grid lines is produced in which the astigmatism is distributed over the entire pattern of grid lines in a predetermined manner, a standard grid viewing system from which rays are traced is then assumed, and surface normals for each grid crossing are calculated by using the grid object and grid image as known quantities and solving for each surface normal using the law of refraction and determining the surface of the lens from the respective surface normals.

3 Claims, 2 Drawing Sheets

U.S. Patent    Nov. 29, 1988    Sheet 1 of 2    4,787,733
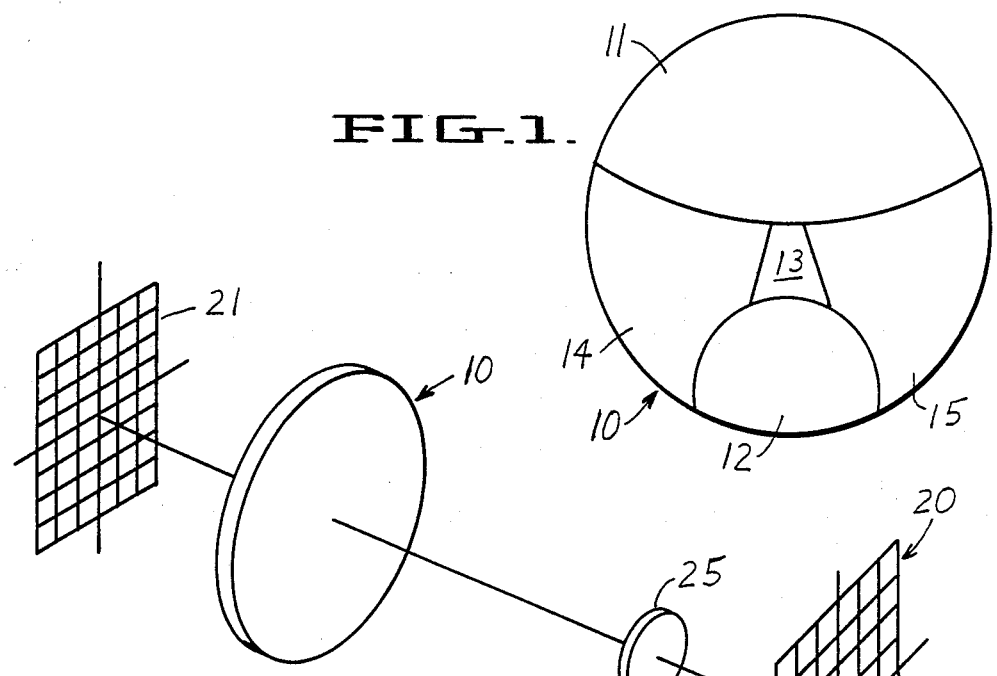
FIG.1.
FIG.2.
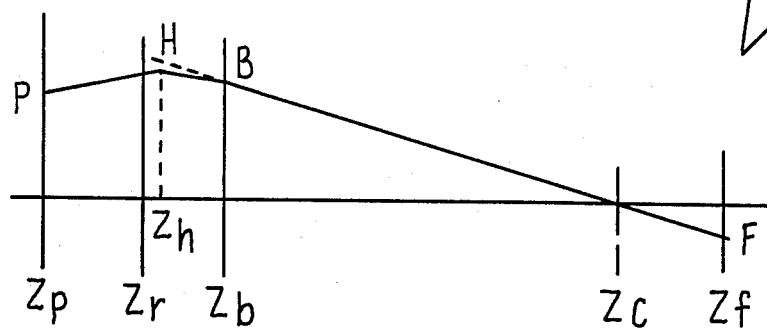
FIG.3.
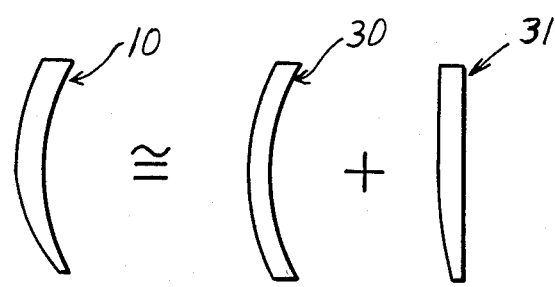
FIG.4.

METHOD FOR DESIGNING PROGRESSIVE ADDITION LENSES

SUMMARY THE INVENTION

This invention relates generally to the design of progressive addition lenses and, more particularly, to a method of designing the surface of progressive addition lenses in which the design is synthesized directly from its specification.

The lens has an upper portion for distance viewing, a lower portion for close-up vision, a transition or progressive zone for smoothly connecting the distance and close-up or reading zones, and two peripheral zones, one being on either side of the progressive zone. Since this progressive addition lens has a continuous surface of varying power, it will have significant levels of astigmatism over some portion of its surface. The manner of dealing with this astigmatism and the distribution of the astigmatism is of central concern to this present invention.

A grid test is used to evaluate a progressive addition lens as it shows directly the distribution of astigmatism. To perform this test, a regular pattern of squares is viewed with a progressive addition lens held before it. The manner in which the lines are distorted shows the distribution of astigmatism in that lens.

The prior art utilizes different ways of distributing astigmatism over the surface of the lens. Some lenses, such as earlier bifocal designs, simply utilized discontinuity between the two viewing regions. Later designs utilize continuously progressive central corridors, either with peripheral zones in which the grid lines bow downwardly or, in the later designs, the peripheral zone grid lines are kept more horizontal.

The prior art includes the European patent application No. 0027339 dated Oct. 3, 1980 to Peter R. Wilkinson in which a specific manner is proscribed in which the horizontal and vertical power progresses along the central meridian of the lens. Wilkinson is typical of the prior art in that the design process flows from a stated verbal concept to design and thence to a performance evaluation. This process is repeated until some satisfactory result is achieved. At each step, the evaluation considers the distribution of astigmatism as observed either with the grid test or through the drawing of astigmatism contours. The Wilkinson technique has the further limitation that each add requires a new grid image drawing. The preparation of a new drawing requires repeated iteration.

The present method begins with a grid image drawing which distributes the astigmatism in a predetermined fashion. The surface that produces this particular grid image drawing is determined by the present method.

The present method uses a modified ray trace technique. A standard grid viewing system is assumed from which rays are traced. In this viewing geometry, only the progressive addition lens front surface is not known. The grid object and grid image is known, the latter being prepared by the designer. Thus, the chief ray trace from a point on the grid to the grid image is determined. Knowing the ray entering the progressive addition lens front surface and leaving it, the law of refraction yields the surface normals. This is repeated for all grid crossings.

From the normals the surface can be determined. To change the add for the design, the same grid image is used but the location of the progressive addition lens in the assumed viewing system is adjusted for a particular magnification ratio. In this manner, one grid produces the entire product for that design for the different adds.

It is, therefore, a primary object of the present invention to directly synthesize the surface of a progressive addition lens from a predetermined, specified grid line image.

A further object of the invention is to provide a method of designing the surface of progressive addition lenses in which one grid produces the entire series of designs for the different adds.

A further object of the invention is to provide a method of designing progressive addition lenses in which the astigmatism is held to a predetermined minimum over the entire surface of the lens.

BRIEF DESCRIPTION OF THE DRAWINGS

FIG. 1 is a front view of the surface of a progressive addition lens showing the various zones referred to in the specification;

FIG. 2 is a schematic representation of the setup assumed in the design process of the present invention;

FIG. 3 is a schematic representation of the assumed setup for a modified ray trace utilized by the present method;

FIG. 4 is a schematic representation incorporated in the lens design method of the present invention;

DESCRIPTION OF THE PREFERRED EMBODIMENT OF THE INVENTION

Figure 5A:
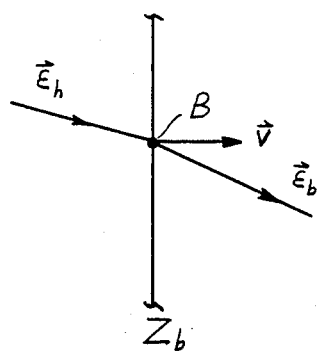
FIGS. 5A, B, C and D show various aspects of the design technique of the present invention.

As shown in FIG. 1, progressive addition lens 10 is provided with distance zone 11, close-up or reading zone 12, progressive zone 13 and peripheral zones 14 and 15.

The present invention assumes the setup shown in FIG. 2 in which the grid image 20 is fixed and the method of design is to use modified ray tracing to design or synthesize the surface of a progressive addition lens 10 which will generate the desired grid line image 20 from grid 21, with ideal camera 25 in the assumed setup between lens 10 and grid image 20.

FIG. 3 shows the setup and the parameters assumed in defining the viewing geometry. The present method proceeds to determine what surface will provide the desired grid line image when the surface is placed within the assumed viewing geometry. A computation will be utilized which determines the position, $Z_r$, of the lens. It depends on the add of the progressive addition lens and the ratio of the grid spacings in the reading and distance zones of the grid image 20.

Referring to FIG. 3, the grid object is placed in plane $Z_p$, the grid image which has been predetermined is placed in plane $Z_f$. The camera lens is at plane $Z_c$ which includes the aperture stop for the system. The front vertex of the progressive addition lens is in plane $Z_r$ and the back plane of the progressive addition lens (now a flat plane) is in plane $Z_b$. Points P and F are the object and image points, while B and H are points of the ray intersection with the progressive addition lens surface. Point H lies on the progressive addition lens surface and its determination is the objective of this procedure. Plane $Z_h$ contains point H and therefore this plane varies according to this intersection.

The predetermined grid line image has been selected without the viewing geometry in mind. Therefore, if the method is to yield a progressive addition lens of the correct add, the position of the progressive addition lens ($Z_r$) must be adjusted. The adjustment is made by taking the ratio of the grids in the distant zone to the reading zone of the predetermined grid image and finding the value of $Z_r$ that will give the intended add. This particular ratio is identical to the ratio of the optical system's magnification with a spherical lens at $Z_r$ and of power equal to the add and with it removed.

The magnification in the first case is obtained from the lens maker formula: $M_o = 1/(1 - K_2/Z_c)$ where $K_2$ is the power of the camera lens. Using $K_1$ as the power of the add and placing the progressive addition lens at $Z_r$, the system magnification is, $$M_t = \frac{Z_c}{1 - K_2 Z_c} \cdot \frac{1}{K_1 Z_r^2 - K_1 Z_r Z_c + Z_c}$$

The ratio of these magnifications is, $$\rho = Z_c/(K_1 Z_r^2 - K_1 Z_r Z_c + Z_c)$$

from which $$K_1 Z_r^2 - K_1 Z_r Z_c - Z_c/\rho = 0$$

This quadratic equation is solved for $Z_r$. With this value of $Z_r$, the predetermined grid image will yield the correct add.

FIG. 4 shows schematically a simplification which may be made in the present method. A progressive addition lens can be considered to first approximation to be the sum of a spherical lens 30 with the base curvature and the progressive addition lens adjustments 31. The base curve is added back to the design at the end of the design process. Another simplification is that of the many rays that can be traced for each point of the object, one ray uniquely defines the progressive addition lens surface. It is the ray that passes through the center of the stop placed in the plane of the camera lens, known as the chief ray. From FIG. 3, it is seen that the image point F defines a point of intersection with the back surface of te progressive addition lens. This surface is now plane, in line with the previous assumption noted above.

Each grid image point F, has a unique ray intersection with the surface at B. It is in this manner that the progressive addition lens surface will be developed. Each grid image point defines a point B. One can imagine that a prism of the appropriate power and orientation will be placed at this point to redirect the ray to meet its corresponding object point. What is done conceptually is that the front surface of the progressive addition lens is tilted with the same slope and orientation as that prism.

Four points define four regions or prisms in the progressive addition lens. It is important to have a grid image with sufficiently dense grid crossings. Three to four hundred grid crossings are adequate to specify the progressive additon lens, although for better control more points may be used. Grid interpolation can be used to increase the density of points.

At this point in the design concept, a set of prisms is obtained. To obtain the surface, the prisms are added using continuity consideration. The surface is smoothed through spline interpolation.

The chief ray is traced for each point F and P. FIG. 3 shows that the point B is determined by point F and the distances along the optic axis. Point B is obtained by, $$X_b = X_f(Z_c - Z_b)/(Z_f - Z_c)$$

$$Y_b = Y_f(Z_c - Z_b)/(Z_f - Z_c)$$

The ray from point B to F is defined by the viewing by the viewing geometry. The ray direction components are:

$$\rho_f = [Z_f^2 + Y_f^2 + (Z_f - Z_c)^2]^{\frac{1}{2}}$$

$$\epsilon_{bx} = -Z_f/\rho_f \; \epsilon_{by} = = Y_f/\rho_f \; \epsilon_{bz} = (Z_f - Z_c)/\rho_f$$

The ray direction from H to B is defined by refraction at point B. (Refer to FIG. 5A.) The surface normal and the exiting ray are known at this point from which the ray direction is determined. The general law of refraction is:

$$n'\vec{\epsilon}' = n\vec{\epsilon} + b\vec{v}$$

where $\vec{\epsilon}$ is the ray unit vector, $\vec{v}$ the surface normal, n the index of refraction, and the prime denotes quantities after refraction.

Figure 5B:
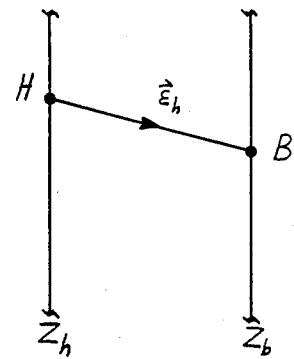

The surface normal at point B is $\vec{v} = \hat{k}$, that is a unit vector parallel to the optic axis. The general law of refraction is used to determine the ray from point H to B, $\vec{\epsilon}_h$. The following values apply:

$n' = 1.0$, $n = n_l$ the index of refraction for the lens material,
$\vec{\epsilon}' = \vec{\epsilon}_b$, $\vec{\epsilon} = \vec{\epsilon}_h$ The formula simplifies upon substitution to $\epsilon_{bx} = n_l \epsilon_{hx} \; \epsilon_{by} = n_l \epsilon_{hy} \; \epsilon_{bz} = n_l \epsilon_{hz} + b$, where,
$b = \epsilon_{bz} - (n_l^2 - 1 + \epsilon_{bz}^2)^{\frac{1}{2}}$, and
$\epsilon_{hx} = \epsilon_{bx}/n_l$
$\epsilon_{hy} = \epsilon_{by}/n_l$
$\epsilon_{hz} = (\epsilon_{bx} - b)/n_l$ Knowing point B, the ray direction from H to B, and the distance $(Z_b - Z_h)$, the point H is determined. (Refer to FIG. 5B.)

$$X_h = X_b + (Z_h - Z_b)\epsilon_{hx}/\epsilon_{hz}$$

$$Y_h = Y_b + (Z_h - Z_b)\epsilon_{hy}/\epsilon_{hz}$$

Figure 5C:
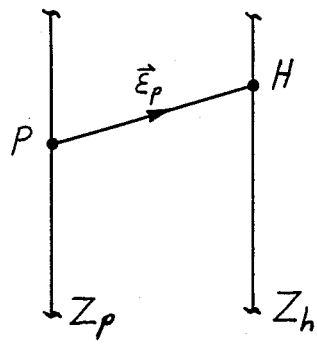

The ray direction from point P to H can be determined since both points are known. (Refer to FIG. 5C.)

$$\rho_p = [(X_p - X_p - X_h)^2 + (Y_p - Y_h)^2 + (Z_p - Z_h)^2]^{\frac{1}{2}}$$

$$\epsilon_{px} = (X_h - X_p)/\rho_p \epsilon_{py} = (Y_h - Y_p)/\rho_p$$

$$\epsilon_{pz} = (Z_h - Z_p)/\rho_p$$

Figure 5D:
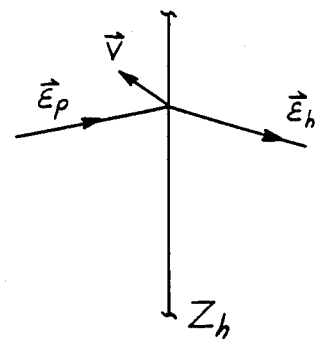

The entering and exiting rays to the surface at point H are known, so the surface normal at this point (Refer to FIG. 5D.)

$$b\vec{v} = n'\vec{\epsilon}' - n\vec{\epsilon}\epsilon = n_l\vec{\epsilon}_h - \vec{\epsilon}_p$$

$$bv_x = n_l\epsilon_{hx} - \epsilon_{px} \; bv_y = n_l\epsilon_{hy} - \epsilon_{py} \; bv_z = n_l\epsilon_{hx} - \epsilon_{pz}$$

where $$b=[(bv_x)^2+(bv_yO^2+(bv_z)^2]^{\frac{1}{2}}$$

Therefore $$v_x=(n_l\epsilon_{hx}-\epsilon_{px})/b$$

$$v_y=(n_l\epsilon_{hy}-\epsilon_{py})/b$$

$$v_z=(n_l\epsilon_{hz}-\epsilon_{pz})/b$$

The computation thus far has given us the surface normal for the progressive addition lens at point H. The process is repeated for all points in the grid image. In this way, we end up with an array of surface normals that must be converted into surface heights.

Figure 6:
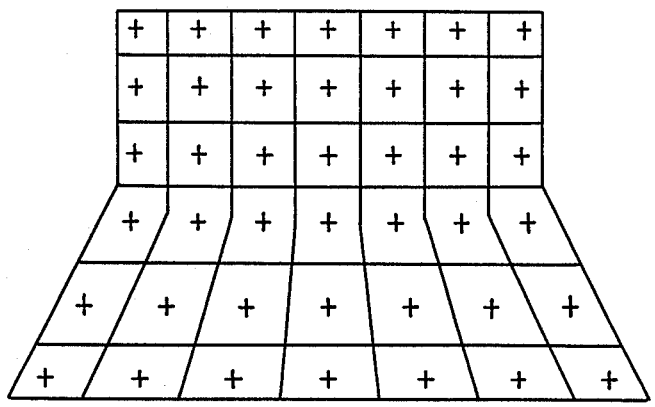
FIG. 6 shows a further aspect of the design technique of the present invention.

The foregoing computation produces an array of surface normals. An area of the progressive addition lens is assigned to this normal. Each area is considered to be a plane with surface normal given by the array value. The boundary of the plane is defined by the midpoints between neighboring array points. (Refer to FIG. 6.)

The surface heights are obtained from the surface slopes by a process of summation. The constant of summation is the reference point from which all the heights are measured. This reference height is taken as zero at the vertex of the progressive addition lens, i.e., $X=0$, $Y=0$.

Figure 7:
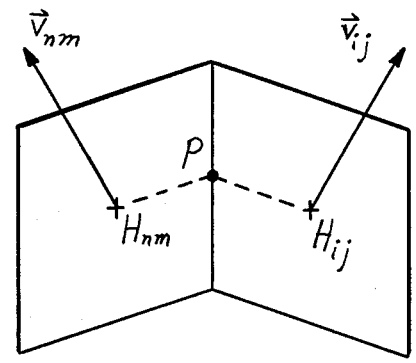
FIG. 7 shows another aspect of the design technique of the present invention.

The computation begins from the vertex of the progressive addition lens where the height is assumed to be zero and expands outward from there. Consider two neighboring planes at array points (i,j) and (n,m) as shown in FIG. 7. The height at point (n,m) is known from a previous calculation and therefore its Cartesian coordinates are known. The general form of the equation for a plane is:

$$\alpha(X-X_o)+\beta(Y-Y_o)+\gamma(Z-Z_o)$$

where $X_o$, $Y_o$, $Z_o$ is a point on the surface and $\alpha$, $\beta$, $\gamma$ are the direction cosines of the normal. The condition that the ends of the planes tough at point P is imposed. Point P is the midpoint between the two array points and is given by, $$P_x=(X_{ij}+X_{nm})/2 \quad P_y=(Y_{ij}+Y_{nm})/2$$

where i,j are the indices of the point in question and n,m is that for the previous point. Using these values for point at (n,m) in the equation for a plane we find the z coordinate for the point at P as, $$P_z=Z_{nm}-[\alpha_{nm}(P_x-X_{nm})+\beta_{nm}(P_y-Y_{nm})]/\gamma_{nm}$$

where $Z_{nm}$ is the height of the previous point. Using the equation of a plane for the plane containing the unknown height we obtain, $$Z_{ij}=P_z+[\alpha_{ij}(P_x-X_{ij})+\beta_{ij}(P_y-Y_{ij})]/\gamma_{ij}$$

What is left is to continue these calculations for the next neighboring points until all the surface heights are calculated.

The above analysis includes the assumption that the initial progressive addition lens surface was a plane. Surface normals were computed at intersections with this initial surface. From these normals, the surface heights were computed. The computed surface is a better estimate of the desired progressive addition lens than the initial plane. The process is repeated using these results to compute new surface normals from which new surface heights are obtained. The process could be repeated using these new surface values to improve the surface estimate. A single iteration is sufficient to yield an accurate estimate of the lens surface.

At this point in the design process we have defined the surface at a set of points defined by the intersection of the rays from the image plane, points B in FIG. 3. The numerical control machine requires a denser array of points than will normally be specified. These additional points are obtained by spline interpolation.

The effect of the spline interpolation is to slightly alter the design due to smoothing. The performance of the progressive addition lens is not significantly altered due to smoothing. Some smoothing takes place in any event due to the slumping process that is used to generate the mold.

AN EXAMPLE

An example is presented to show how the rays are traced. The data are:
$Z_p=0$; $Z_r=164$; $Z_b=169$; $Z_c=1200$; $Z_f=1440$; $N_1=1.5$; $X_p=40$; $Y_p=0$; $Y_p=0$; $X_f=56.87$; $Y_f=0$.
The point B is computed:

$$X_b=11.37(1200-169)/(1440-1200)=48.86081$$

$$Y_b=0$$

The ray directions from B to F are:

$$\rho_f=[(11.37)^2+(1440-1200)^2]^{\frac{1}{2}}=240.27$$

$$\epsilon_{bx}=-11.37/\rho_f=-0.04734 \quad \epsilon_{by}=0$$

$$\epsilon_{bz}=(1440-1200)/\rho_f=0.99888$$

The refraction at point B:

$$b=\epsilon_{bz}-[1.5^2-1+\epsilon_{bz}^2]^{\frac{1}{2}}=-0.50037$$

$$\epsilon_{hx}=-0.04734/1.5=-0.03256 \quad \epsilon_{hy}=0$$

$$\epsilon_{hz}=(0.99888-(-0.50037))/1.5=0.99950$$

The Point H is obtained:

$$X_h=48.86081+(164-169)(-0.03156)/0.99950=49.0186$$

$$Y_h=0$$

The ray directions from point P to H:

$$\rho_p=[(40-49.018)^2+(0-164)^2]^{178}=164.24779$$

$$\epsilon_{px}=(49.01868-40)/\rho_p=0.05491 \quad \epsilon_{py}=0$$

$$\epsilon_{pz}=(164-0)/\rho_p=0.99849$$

The surface normals at point H are:

$$bv_x=1.5(-0.3156)-0.05491=-0.10225$$

$$bv_y=0 \quad bv_y=0 \quad bv_z=0.50076 \quad b=0.51109$$

$$v_x=-0.20006 \quad v_y=0 \quad v_z=0.97978$$

What is claimed is:

1. A method of designing the surface of a progressive addition lens having an upper portion for distance viewing, a lower portion for close-up vision, a transition zone between the upper and lower portion, and two peripheral zones, comprising the following steps:

producing a desired pattern of grid lines in which the astigmatism is distributed over the entire pattern of grid lines in a predetermined manner, applying ray tracing to determine what lens surface is required to obtain said desired pattern of grid lines, by assuming a grid viewing system from which rays are traced, calculating surface normals for each grid crossing by using the grid object and grid image as known quantities and solving for each surface normal using the law of refraction, and determining the surface heights of the lens directly from said calculated surface normals for each said grid crossing.

2. The method of claim 1 wherein the surface is designed for various adds to the design by using the same desired pattern of grid lines wherein the location of the progressive addition lens in the assumed viewing system is adjusted so that the magnification ratio is for a particular add.

3. The method of claim 1 comprising the further step of utilizing a numerically controlled machining operation for manufacturing said lens surface which uses said calculated surface heights for each of said grid crossings.

* * * * *

UNITED STATES PATENT AND TRADEMARK OFFICE
CERTIFICATE OF CORRECTION

PATENT NO. : 4,787,733

DATED : November 29, 1988

INVENTOR(S) : Donald E. Silva

It is certified that error appears in the above-identified patent and that said Letters Patent is hereby corrected as shown below:

col. 4, line 13; "by the viewing" should be deleted
col. 4, line 16 should read as follows:

$$\rho_f = [X_f^2 + Y_f^2 + (Z_f - Z_c)^2]^{1/2}$$

col. 4, line 54 should read as follows:

$$\rho_p = [(X_p - X_h)^2 + (Y_p - Y_h)^2 + (Z_p - Z_h)^2]^{1/2}$$

col. 4, line 63 should read as follows:

$$b\vec{v} = n'\vec{\varepsilon}' - n\vec{\varepsilon} = n_1 \vec{\varepsilon}_h - \vec{\varepsilon}_p$$

col. 5, line 1 should read as follows:

$$b = [(bv_x)^2 + (bv_y)^2 + (bv_z)^2]^{1/2}$$

UNITED STATES PATENT AND TRADEMARK OFFICE
CERTIFICATE OF CORRECTION

PATENT NO.   : 4,787,733
DATED        : November 29, 1988
INVENTOR(S)  : Donald E. Silva It is certified that error appears in the above-identified patent and that said Letters Patent is hereby corrected as shown below:

col. 6, line 25 should read as follows:
$$N_1 = 1.5 \quad X_p = 40 \quad Y_p = 0 \quad X_f = 56.87 \quad Y_f = 0$$

col. 6, line 43 should read as follows:
$$\varepsilon_{hx} = -.04734/1.5 = -.03156 \quad \varepsilon_{hy} = 0$$

col. 6, line 55 should read as follows:
$$f_p = [(40-49.018)^2 + (0-164)^2]^{\frac{1}{2}} = 164.24779$$

col. 6, line 64 should read as follows:
$$bv_y = 0 \quad bv_z = .50076 \quad b = .51109$$

Signed and Sealed this

Second Day of May, 1989

*Attest:*

DONALD J. QUIGG

*Attesting Officer*     Commissioner of Patents and Trademarks